Jan. 11, 1966  J. A. GLASSMAN  3,228,789
PERORAL CAPSULES AND TABLETS AND THE METHOD FOR MAKING SAME
Filed Oct. 22, 1962  3 Sheets-Sheet 1
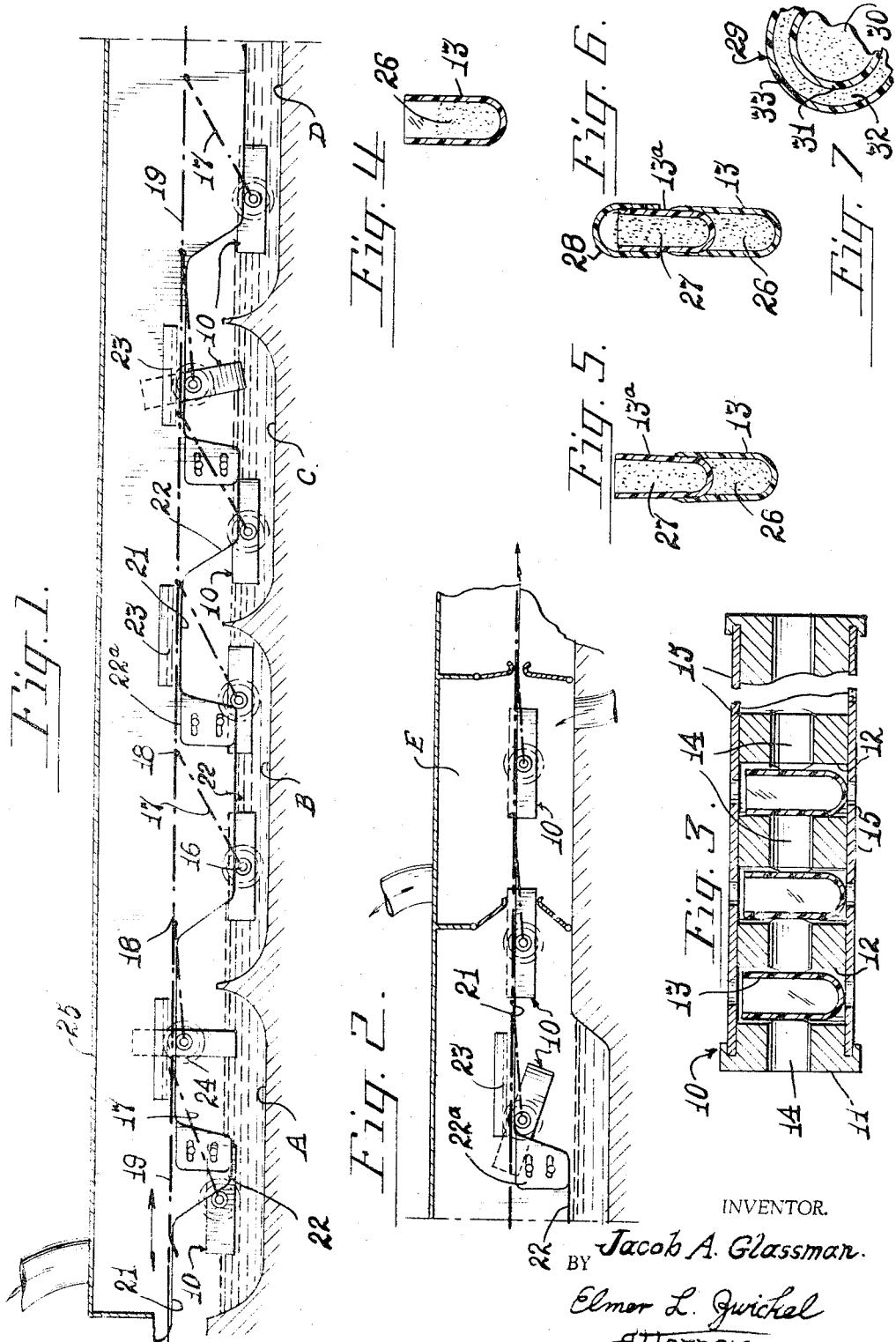
INVENTOR.
Jacob A. Glassman
BY Elmer L. Zwickel
Attorney.

Jan. 11, 1966  J. A. GLASSMAN  3,228,789
PERORAL CAPSULES AND TABLETS AND THE METHOD FOR MAKING SAME
Filed Oct. 22, 1962  3 Sheets-Sheet 2

INVENTOR.
Jacob A. Glassman
BY
Elmer L. Gwickel
Attorney.

Jan. 11, 1966   J. A. GLASSMAN   3,228,789
PERORAL CAPSULES AND TABLETS AND THE METHOD FOR MAKING SAME
Filed Oct. 22, 1962   3 Sheets-Sheet 3

INVENTOR.
Jacob A. Glassman
BY Elmer L. Zwickel
Attorney

United States Patent Office 3,228,789
Patented Jan. 11, 1966

3,228,789
PERORAL CAPSULES AND TABLETS AND THE
METHOD FOR MAKING SAME
Jacob A. Glassman, 1680 Meridian Ave.,
Miami Beach, Fla.
Filed Oct. 22, 1962, Ser. No. 232,102
12 Claims. (Cl. 117—118)

This application is a continuation-in-part of my pending application Serial No. 174,951, filed February 23, 1962.

The present invention relates to improvements in the production of peroral capsules and in multi-layered tablets or pellets and the steps of the method of making same. More particularly, the invention is concerned with the treatment of gelatin capsule components, gelatin sheets useful in making capsule components, and gelatin coated tablets, pellets and like pharmaceutical products by such novel means and in such novel manner as to critically control the rate of solubility of a capsule, tablet or pellet or selected parts thereof to obtain critical delayed or timed release of medicament in the stomach, in the duodenum or jejunum and/or in the lower ileum or at any preselected absorptive level of the intestinal tract.

A standard method of dispensing medicaments in dosage form involves the housing of such medicaments in capsules of specific solubilities such as gelatin-glycerin capsules, pure gelatin capsules, starch or sugar gelatin capsules and capsules made of a variety of other soluble gelatin combinations. They serve as an excellent housing for powders, masses, liquids, pellets and oils and offer improved palatability and convenience and eliminate objectionable drug taste and odor. Attempts heretofore made to administer capsulated medicaments on a controlled or timed release basis at various levels in the intestinal tract have been most dissappointing. Prior known attempts have included the packaging of medicaments in compartmented capsules wherein the walls of different compartments are of different thickness. Extensive experimentation has established that the different compartments of a multicompartmented gelatin capsule in its pure gelatin state are digested by the stomach juices in essentially the same time and at the time site, thus liberating all contents into the stomach lumen at approximately the identical time; and that no portion of the compartmented capsule remains intact for a sufficiently long period of time to cause delayed release of any of its contents into the duodenum, jejunum or ileum.

Various unsuccessful attempts have been made to overcome this objectionable characteristic of pure gelatin capsules including exposing filled gelatin capsules to an atmosphere of formaldehyde gas; immersing same in a formaldehyde alcohol solution and then air drying or washing in water. However, it has been found that because gelatin is soluble in water and small quantities of water are contained in the formaldehyde-alcohol solution, absolute dehydration and critical fixation or neutralization of the formaldehyde during air drying is impossible to attain. Similarly, when gelatin capsules treated in this manner are washed in water, the water has the effect of softening the gelatin. Furthermore, because of the practice of batch immersion, as by dumping filled or unfilled capsules into vats and agitating them, the capsules are subjected to crenation of the walls or complete collapse of the walls and loss of perfect cylindrical contour. Obviously, such practice is unsuited for treatment of capsule components because of resulting failure of the distorted components to mate.

Exposure of gelatin to concentrations of formalin gas for the purpose of making it acid resistant has resulted also in undesirable changes, such as complete insolubility, especially after standing one, two or three weeks. The reason for this failure is that formalin gas causes an almost instantaneous reaction with the gelatin which does not stop despite air drying or washing; the chemical reaction continues until the gelatin is rendered completely insoluble throughout its entire thickness.

Also, formalinizing hard and soft gelatin capsules with a formaldehyde solution as commercially available has rendered the capsule or coating too insoluble and unfit for use, especially after several days standing. This arises from the fact that a complete chemical interreaction takes place between the amino groups of the gelatin protein and the formalin with the creation of a new chemical substance having unwanted characteristics, namely, reduced water swelling properties and complete insolubility. These undesirable characteristics have been repeatedly experienced even though the aqueous formalin concentrations were reduced from 40% to 10%, 5% and even as low as 1%.

Known efforts to effect time delay release of medicaments administered in tablet or pellet form have also been dissapointing and ineffective. For example, in one known instance tablets have been compounded of a mixture of non-time delay and time-delay medicament granules to provide different time release for each group in an attempt to maintain continuously a desired therapeutic level. The admixture in tablet form of incompatible granular is not possible in such instances. Also, such granular containing tablets are ineffective for time controlled medication at different digestive levels owing to the disintegration and chemical alteration of the tablet or pellet and release of the granules in the stomach. Upon such disintegration, the time-delay granules are separated one from the other and each must find its way out of the stomach and into the intestinal tract where they are separately broken down and finally absorbed at different levels but in varying unpredictable amounts. In a great many instances they are altered by chemical interaction by the HCl and/or peptic enzymatic action in the stomach before passing therefrom. In either event, only a non-predictable portion of the intended time-delay granules are effectively released in the intestinal tract, while another portion is eliminated, unabsorbed and possibly even unchanged, offering little or no therapeutic effect. The latter shortcomings and the use of formaldehyde treated capsules and pellets have made them unproductive, unpredictable, too costly and totally unsatisfactory.

The herein disclosed process eliminates any need for any form of an externally applied acid and alkali resistant coating singly or in combination, such as by way of example, acacia, tragacanth, fatty acids, hard fats, keratin, salol, shellac, collodion, starch, glucose, keratin, cellulose acetate, phthalate, sandrac, cellulose derivatives and cetyl alcohol alone or in combination with shellac. The above named acid and alkaline resisting substances are well known coatings that are held firmly to the tablet surface by employing a preliminary coating of various well known binding agents, such as wax, lacquer, glucose, (corn syrup) 10% solution of gelatin, acacia, and inert varnish. However, such coatings have the following undesirable characteristics hence their use is precluded.

Keratin is invariably disintegrated in the stomach, and those resisting stomach juice fail to disintegrate in the intestines.

Phenylsalcylate (Salol) breaks down in the stomach.

Fat and fatty acids fail to form hard enough coating because of their low melting points. They do not resist the enzymatic and peristaltic action of the intestine and are unreliable in acid-pepsin and alkaline-pancreatic juices.

Waxes and combinations of waxes crack on standing.

Cellulose acetate phthalate, etc., allows gastric juice to penetrate into it and allow enclosed medicament to diffuse out.

The present controlled use of formalin solutions and a chemical drying agent generates an impenetrable surface by incompletely altering the intrinsic chemistry of the hard gelatin wall in controlled depth so that it resists gastric acidity (low pH), wetness, warmth (37° C.) peristaltic action and enzymatic breakdown.

The present invention has for one of its advantages the provision of a novel method and means to afford time-delay or controlled release of granular or liquid medicaments and in a manner that insures that each medicament is conveyed to the situs intended, chemically unaltered, so as to insure controlled medication at selected levels of the digestive tract. The herein disclosed method and means used for compartmenting unadulterated liquid or solid medicaments, whether they be alike, compatible or incompatible, is such that each medicament, and each full dosage thereof, is released unadulterated and delivered to the situs intended in a therapeutically pure state.

In order to overcome the shortcomings of prior efforts, applicant has treated the walls forming the various compartments of a compartmented capsule, or at least the walls of some of the compartments; as well as the walls of a single compartmented capsule with substances and by the novel method herein disclosed that stops formalinization and renders the walls critically resistant to gastric digestion. Although the specific wall thickness of the gelatin capsule is not critical, it was determined that a wall thickness of $1/128''$ or $1/64''$, when treated with a solution in the manner more fully disclosed hereinafter, was adequate to insure timed dissolution of the treated gelatin walls and controlled release of the medicaments. Applicant has found that subjecting the gelatin component to a low critical concentration of aqueous formalin solution and/or of alcoholic-formalin solutions for critical time periods and subsequently immersing such treated capsules in a chemical drying agent, such as absolute alcohol, for predetermined critical periods of time immediately stops the process of formalinization. The improved process avoids serious loss of capsular component parts heretofore resulting from shrinkage, distortion, decreased size and circumferential distortion.

The herein disclosed method and means involves the immersion of the capsule components for a predetermined critical time period in a solution of formaldehyde, while retaining them in fixed non-contacting positions in a suitable holder. This initial step is followed in succession by immersing the holder and contained capsule components into (a) absolute alcohol or an equivalent chemical drying agent; (b) a formaldehyde-alcohol solution and finally into (c) a second body of absolute alcohol of its equivalent. Both bodies of the chemical drying agent preferably contain cupric sulphate (anhydrous) to continue to extract the imbibed water, thereby maintaining its absolute property. Following withdrawal from each immersion, the holder containing the capsule components is rotated; or otherwise moved so as to insure total drippage of any free solution remaining thereon and, following the last immersion in the chemical drying agent, the capsule components are warm-air dried under temperature controlled conditions by flowing currents of warm air over them.

The aforesaid novel method of and means for treating capsule components, tablet or pellet coatings, or gelatin sheets for use in making capsule components, in depth overcomes all of the aforementioned objectionable characteristics by controlled fixing of the interaction of the formaldehyde solution and by permanently rendering the superficial layer of the treated capsular walls almost completely insoluble in acid medium and predictably soluble in alkalin media. This obviates the time devoted for extra coating processes and the use of elaborate equipment heretofore required, and completely obviates the need for extra cohesive binders.

It is therefore an object of this invention to provide a peroral pharmaceutical capsule or pellet having one, two or more medicament containing compartments or layers, each defined by a gelatin wall each having predetermined critically different dissolution properties through the treatment of the gelatin with critical concentrations of formalin solution, and with alcoholic-formalin solutions for critical periods of time, and with a chemical dehydrating agent, so that desired portions or layers thereof will be dissolved by specific acid or alkaline chemical reaction at various times and at various levels in the gastro-intestinal tract.

Another object is to provide novel means for successfully administering in the form of a single capsule or tablet, a combination of medicaments that would ordinarily be incompatible, thus attaining an entirely new safe and synergistic pharmacologic action, despite incompatibility, with a new therapeutic result.

Another object is to provide a pharmaceutical capsule or tablet having some or all of its gelatin walls or coatings treated externally and/or internally with critical weak concentrations of formalin solutions and/or an alcoholic-formalin solution, and a chemical drying agent to generate protein changes of predictable depth so that different compartments of a compartmented capsule or layers of a tablet or pellet have different rates of dissolution during passage of the capsule or tablet along the gastro-intestinal tract.

Another object is to provide a novel method for pretreating individual gelatin capsule components in multiple steps and in varying manners, before the said gelatin capsule components are assembled into a unitary whole comprised of one, two or more compartments.

Another object of the invention is to provide a novel apparatus for mass treating and chemical dehydration of individual gelatin capsule components in multiple steps and in varying manners before their assembly into a unitary whole to prevent mass spoilage and waste.

The foregoing and other objects and advantages of the invention will be better understood upon reference to the accompanying drawings in which:

FIG. 1 and FIG. 2 are schematic views illustrating the steps of and an exemplary apparatus for treating capsule components.

FIG. 3 is an enlarged fragmentary sectional view of a representative holder, showing capsule components in place therein.

FIG. 4 is a sectional view of a treated capsule component containing a medicament.

FIG. 5 is a view similar to FIG. 4, showing two capsule components telescoped one into the other, and a medicament in the second component.

FIG. 6 is a view similar to FIG. 5, showing the assembled capsule capped.

FIG. 7 is a representative fragmentary portion of a tablet or pellet treated by the herein disclosed method.

Figure 9:
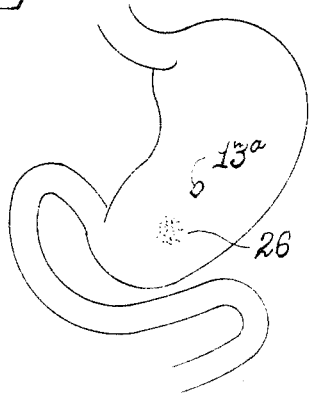
FIG. 9 is a schematic view illustrating an X-ray study of the initial separation of treated and untreated portions of a two-compartmented capsule after intake, and showing the untreated capsule portion dissolved and releasing its contents.

Referring to the exemplary disclosure of a representative apparatus useful in performing the steps of the method of gelatin capsule treatment, the apparatus will include essentially a series of vats successively spaced apart and indicated in FIGS. 1 and 2, at A, B, C and D. The vat A contains an aqueous formaldehyde solution. Vat B contains a dehydrating agent such as absolute alcohol (100%) with or without a minute quantity of cupric sulphate to insure removal of all water from the body of absolute alcohol. Vat C contains a formaldehyde-alcohol solution, whereas vat D contains a dehydrating agent such as absolute alcohol (100%) with or without cupric sulphate.

Suitable means, to be described presently, is provided to successively advance capsule components from one vat to the next so as to successively immerse the components for predetermined critical time periods in the contents of each vat. During such immersion, the capsule components are held spaced one from the other in individual chambers or pockets formed in suitable headers or holders and in a manner so that they shall not at any time come into contact one with the other with resultant loss in shape or adhesion one to the other. Following each immersion, the capsules are inverted as by spinning their holders or otherwise, so as to insure that all traces of free fluid into which they have been immersed is drained therefrom. After leaving the second or final dehydrating agent immersion (vat D), the capsule components and their holders are carried through a drying area E (FIG. 2) having warmed air at controlled temperature circulated therethrough. Upon leaving the quick drying area, the capsule components are then carried to an approved warm air store room and kept until ready for delivery to a conventional filling machine. To facilitate filling, the holders herein disclosed are adapted to enter or fit into said machine so that they may discharge their capsule contents directly into the conventional chambers or sockets of the filling machine.

The aqueous formaldehyde solution found to be the most ideal is a solution of 0.5% by volume but it has been established that the concentration may range from 0.1% to 0.95% by volume.

As a dehydrating chemical agent, applicant has, because of availability and cost considerations, used absolute alcohol with or without a small quantity of cupric sulphate added as a dehydrating agent for the alcohol, although other chemical drying agents such at tetrahydrofurfuryl alcohol, butyl alcohol, ether or acetone have been found to be very effective to insure rapid extraction of all free water from the gelatin wall and rapid removal of all extractable free formaldehyde from the gelatin wall.

In the formaldehyde-alcohol solution herein mentioned, the formaldehyde concentration may vary from 5% to 15% by volume, but applicant has found that a critically ideal solution has a formaldehyde concentration of about 10% by volume with an alcohol concentration of from 75% to 95%, but preferably about 85%.

The process or steps and solutions generally described above are particularly suited for controlling the chemical reaction of the formaldehyde solution on the gelatin. More specifically, the water in a 0.5% formaledhyde solution (vat A) is necessary to rapidly soften and facilitate or catalyze the chemical penetration of the formaldehyde. The first immersion in the dehydrating chemical agent (vat B) quickly and effectively extracts the remaining free water and formaldehyde from the gelatin so as to immediately stop any further chemical interaction between the formaldehyde and gelatin. The following immersion in the formaldehyde-alcohol solution (vat C) imparts slowly a further controlled fixation to the gelatin components, while the second immersion in the dehydrating chemical agent (vat D) quickly and effectively dries out the last remaining free water and formaldehyde from the gelatin components and all further interaction, if any, is totally stopped by then subjecting the capsule components to controlled warm air drying (area E). As a result, the capsule components are treated in controlled depth, without the slightest trauma to the gelatin bodies and without matting, telescoping, collapse or crenation or distortion of their tubular walls, which is so essential to mating of capsular components.

Referring again to the disclosure in the drawings, and particularly to FIG. 3, the holders 10 for the gelatin capsule components may be of any suitable specific construction. They may include a suitable body 11, circular, square or rectangular, having an overall pattern of openings 12 each forming a chamber or pocket to receive a capsule component 13. Communicating passages 14 connect the chambers 12 one with another and with the outside edge faces of body 11. The capsule components preferably are retained in the openings 12 by means of removable perforated cover plates 15. In any event, the holder 10 is honeycombed to insure the free flow of the fluid into and around each capsule compoinent contained therein.

Any suitable conveyor means may be provided to successively advance holders 10 from vat to vat and through and beyond the drying area and to successively immerse the holders and their contents in the contents of said vats during their advance. For example, and not by way of limitation, each holder may be pivotally mounted as at 16, on one end of an arm 17 pivoted at its other end as at 18, to an endless conveyor 19 arranged above the vats and disposed to move longitudinally thereover. Spring means, not shown, is provided to urge support arms 17 upwardly into the plane of the endless conveyor so as to cause pivots 16 to at all times travel along a cam surface 21. As shown, this cam surface has its normal plane substantially coincidental to the plane of the conveyor and it is provided in the region of each vat with downwardly offset areas 22 that functions to urge the holders downwardly into the underlying vat for the necessary period of time not necessarily determined by the speed of the conveyor means. The effective length of the offset areas 22 may be adjustable in length, as shown.

In the present disclosure, the cam area 22 overlying vat A is adjusted to such length as to effect immersion of a related holder for a period of about 10 to 30 seconds. By adjusting plate 22a, the immersion can be increased for up to about 55 seconds, it being adjusted to coordinate the effective length of cam area 22 to the speed of travel of the conveyor and the time required to obtain the desired interaction between the formaldehyde solution and gelatin. Similarly, the cam area 22 above vat B is shown adjusted to a length to cause immersion for about 2 minutes, whereas the cam area over vat C will hold the holder immersed for from 30 to 60 seconds, depending on its critical adjustment, and the cam area over vat D will hold an engaged holder immersed for from 2 to 5 minutes, as required. A common shield 25 may be arranged over the vat system to insure cleanliness and to carry off vapors.

It is important that withdrawal of a holder from each vat be followed by spinning of the holder so as to effect total elimination of all free fluid carried thereby. Such spinning can be effected manually, although it is preferred to provide some automatic means to accomplish this. For example, applicant has shown a rack 23 and pinion 24 combination for this purpose. As is well understood, when a holder is advanced between the vats, the rack-pinion engagement will spin the holder.

It should be apparent that gelatin sheets useful for making gelatin capsule components may be successively immersed in the vats so as to alter their solubility characteristics in depth.

Referring now to the FIG. 4–6 disclosures of a representative two-compartmented capsule structure, FIG. 3 illustrates a capsule component 13 treated internally and externally by the herein disclosed method. The capsule component has retained its shape and size and when a medicament 26 is placed therein, a capsule component 13a may be telescoped thereinto as shown in FIG. 5. Such telescoping is possible when the capsule components are treated as described herein because the capsule components, whether preformed or formed from treated sheets, have retained their tubular shape and size and have not lost the pliability inherent in gelatin. After such assembly, a medicament 27 is placed in the inserted capsule component 13a and a gelatin cap 28 is fitted thereover. Either or all of the components, including cap 28, may be treated by the herein disclosed method of formalinization and to the same or different degress of depth so as to produce a compartmented capsulated product one compartment of which will disintegrate in the stomach shortly after intake, for example, and the remaining compartment disintegrate at a later period of time, so as to allow the medicament in the initially dissolved compartment to reach a low level in the intestinal tract before the second compartment dissolves and liberates its contents into the upper level of the intestinal tract.

Figure 8:
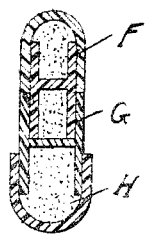
FIG. 8 is an enlarged sectional view of a three-compartmented capsule.
Figure 11:
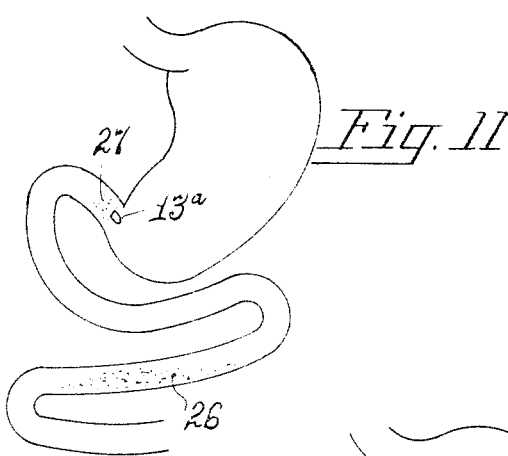
FIG. 11 is a similar schematic view illustrating the relative positions of the contents of the untreated capsule portion and the initial breaking up of the treated capsule portion at about 1½ hours after intake.
Figure 13:
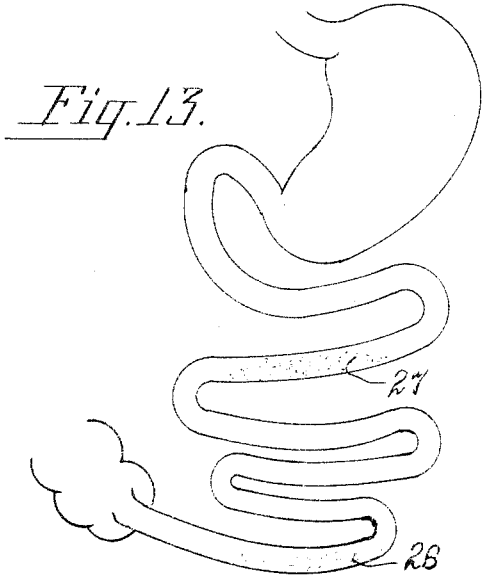
FIG. 13 is a similar view to FIG. 12, showing the situs of the medicaments about three hours after intake.

FIG. 8 is illustrative of a three-compartment capsule wherein, for example, the walls of the compartment F have been treated in depth for a predetermined period of time, the walls of compartment G have been treated for a longer predetermined period of time and the walls of compartment H have been left untreated. The rates of dissolubility are thus staggered.

Although a specific example of treatment of the walls of specific capsule components or gelatin sheets has been recited hereinabove, it is to be understood that the times of immersion in the various vats may be altered so as to obtain a chemical alteration of the gelatin to predetermined depths and hence vary the critical rate of solubility when placed in the environment of acid stomach or alkaline intestinal juices.

In vitro and in vivo testing of capsules of the present invention and blood level studies of test drugs have established that they function for the purposes intended. For example, after approximately one hour of warm air drying at about 80° to 100° F. temperature, after leaving the treating apparatus, capsules treated in depth as herein described and containing a quantity of barium were immersed in gastric juice warmed to about 98° F. and stirred. Dissolution of various capsules varied from 30 to 50 minutes. When treated capsules, dried for about four hours were immersed in the gastric juice, dissolution occurred shortly after one hour, and when dried for five days or longer before immersion in said gastric juice, dissolution occurred shortly after two hours. Applicant has concluded therefore, that optimum drying time is about five days or longer and that the gelatin of the capsules does not become insoluble upon any further standing.

Clinical testing was done with two-compartmented inserted capsules, such as shown in FIG. 6, one compartment of which had its walls treated in depth by the within process. This is illustrated in FIGS. 9 to 13 of the accompanying drawings which are representative of actual X-ray pictures. For purposes of this description, the untreated capsule component is referred to hereinafter as portion 13 whereas the treated capsule component is referred to as portion 13a. Many patients (about 60) were given a capsule on an empty stomach and after a small breakfast. The following observations are representative of both tests and were perceived on multiple X-ray studies of the subject patients.

Figure 10:
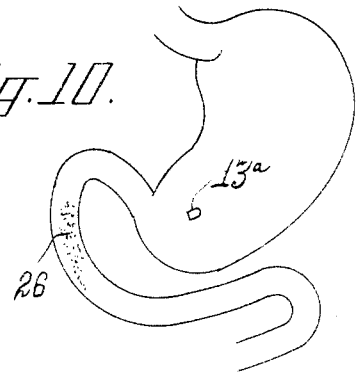
FIG. 10 is a view similar to FIG. 9 showing the relative positions of the contents of the dissolved untreated portion and that of the undissolved treated resistant portion, at about one hour after intake.
Figure 12:
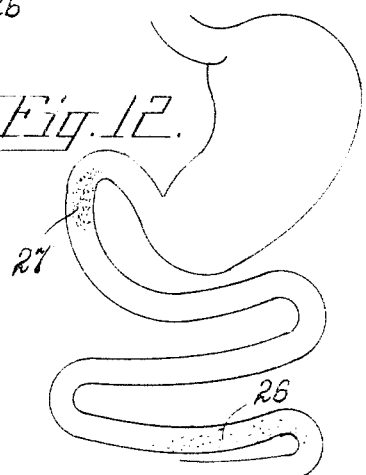
FIG. 12 is a similar schematic view illustrating the relative positions of the contents of the two capsule portions approximately two hours after intake.

Fifteen minutes after intake (FIG. 9) the untreated portion 13 broke up and released its contents 26 into the stomach. Compartment 13a remained intact in the stomach for approximately 1½ hours during which time the released contents moved downwardly through the duodenum (FIG. 10). At about this time portion 13a started to break up and release its contents (FIG. 11) while the contents from compartment 13 had travelled further downwardly and was disposed in the upper jejunum. After two hours, the contents of portion 13 had reached the lower jejunum whereas the contents 27 of portion 13a had been carried into the duodenum (FIG. 12). X-ray pictures taken after two and three hours (FIG. 13) showed that the contents of portion 13 had reached the lower ileum and the contents of portion 13a was now moving through the upper jejunum.

Figure 14:
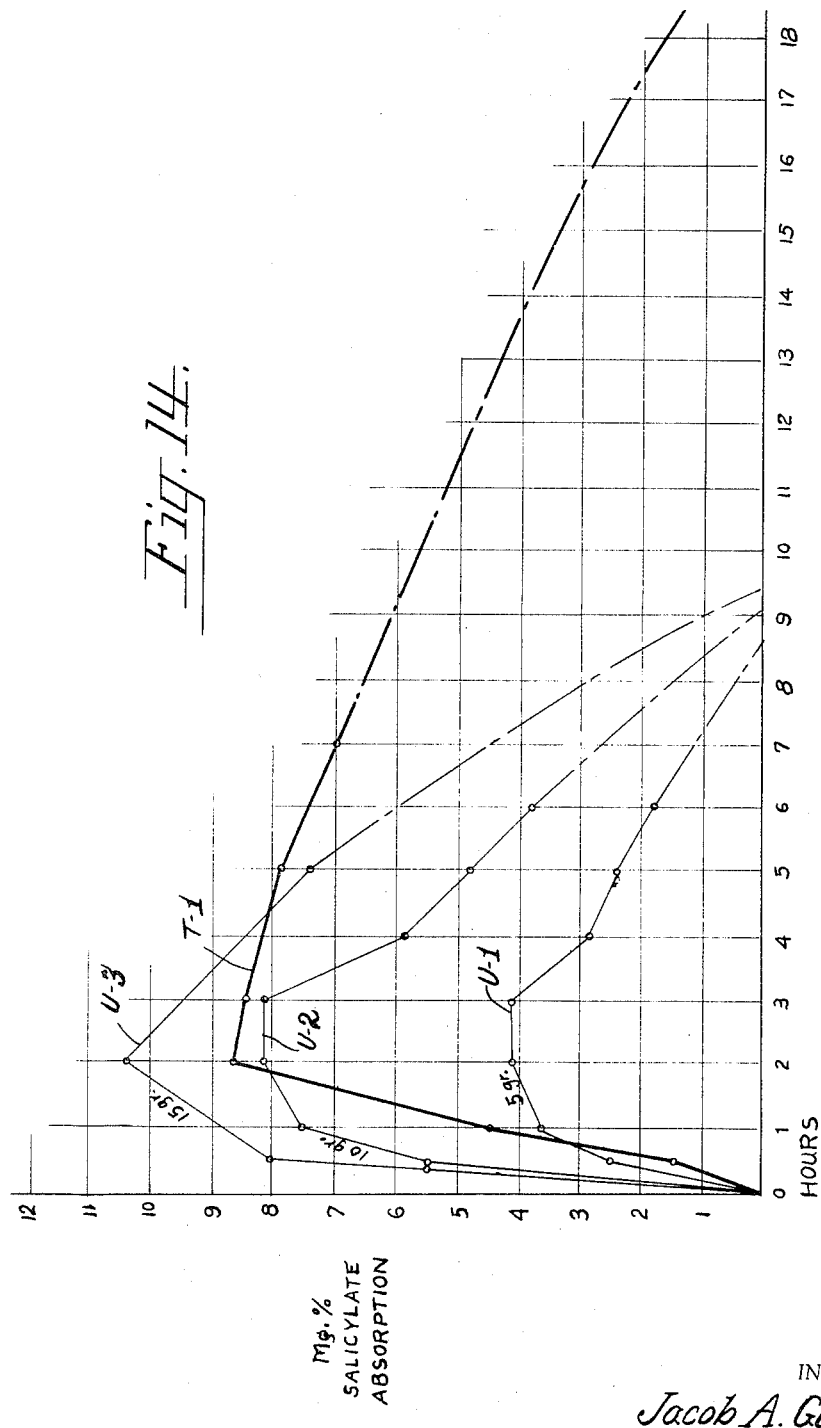
FIG. 14 is a graph illustrating the finding of blood level studies made during absorption of the contents of conventional and the herein disclosed treated capsules.

The graph of FIG. 14 is representative of control studies of blood level evaluations of a test drug (salicylates) administered in ordinary untreated capsules and in capsules treated in depth as herein described. These tests were carried out at hourly intervals and further established that a multicompartmented capsule treated as herein described functioned for the purposes intended. Referring to FIG. 14, wherein the base line has hour indicies and the vertical line is indicative of salicylate blood level. Applicant encapsulated 5 gr., 10 gr. and 15 gr. of salicylate in ordinary capsules and 15 gr. of salicylate in both compartments of a dual compartmented capsule treated as herein disclosed. It has been established, as indicated by curves U-1, U-2 and U-3 that the initial absorption was very rapid and reached its maximum salicylate blood level within one to two hours and in the upper jejunum. Subsequent hourly studies clearly show that there was a progressive sharp drop in the salicylate blood level as evidenced by the broken line extensions of curves U-1, U-2 and U-3, all representative of the use of untreated capsules.

The same studies carried on simultaneously with hourly blood level tests on patients taking the duo-compartmented treated capsules, and represented by curve T-1, established that there is a very sharp initial maximum rise within two hours after intake followed by a rather slow decline as indicated by the broken line continuation of curve T-1. This gradual decline is indicative that effective therapeutic blood levels can be maintained for at least 16 hours or more whereas in the instance of the untreated capsules dissipation of the therapeutic blood levels occurred within 8 or 9 hours. These tests taken simultaneously with the X-ray tests previously referred to clearly establishes that the contents of the untreated portion of the dual-compartmented capsule was initially released in the stomach and maximally absorbed from the duodenum and upper jejunum and that after 1½ to 2 hours or more, the treated capsule compartment broke down and released its contents also in the duodenum and upper jejunum.

Referring to the exemplary disclosure in FIG. 7, of a multi-therapeutic tablet or pellet 29, its core 30 of medicament is covered with a layer 31 of pure gelatin (⅟₁₂₈″ to ⅟₆₄″ thick) and allowed to dry until hardened. The coated core was then carried through the successive stages of formalin and alcohol treatment described hereinabove to chemically alter the outer surface of the gelatin layer 31 in depth. This central coated core portion of the tablet or pellet becomes the last compartment or portion of a multi-layered tablet or pellet to break up.

A layer of therapeutic material 32 is applied over the treated gelatin layer 31 and, after it has dried, another pure gelatin layer 33 is applied thereover, completely covering the same. This outer layer is left untreated to insure its prompt dissolution in the stomach. The outside layer may be coated with a layer of sugar or coloring matter.

Many details may be varied without departing from the spirit of the invention. Therefore, the scope of the appended claims is not to be limited except by their terms.

What I claim and desire to secure by Letters Patent of the United States is:

1. The method of making capsule components of a self-sustaining film of gelatin material which comprises treating its surfaces in successive steps to a 0.5% aqueous formaldehyde solution for from about 5 to 55 seconds, absolute alcohol, a 10% formaldehyde-85% alcohol solution, and then terminating the treatment by immersion in absolute alcohol to effect protein changes to a predictable depth.

2. The method of making capsule components of a self-sustaining film of gelatin material which comprises treating its surfaces in successive steps to a 0.5% aqueous formaldehyde solution for from about 5 to 55 seconds, terminating said treatment by immersion in absolute alcohol, treating its surfaces with 10% formaldehyde-85% alcohol solution for from about 20 to 60 seconds, and terminating this treatment by immersion in absolute alcohol.

3. The method of making capsule components of a self-sustaining film of substantially pure gelatin which comprises treating its surfaces in successive steps with an aqueous solution containing about 0.5% formaldehyde, an absolute alcohol, a formaldehyde-alcohol solution comprised of about 10% to 20% formaldehyde and 70% to 90% alcohol by volume, and absolute alcohol to effect protein changes to a predictable depth in the gelatin.

4. The method recited in claim 3, in which the initial treatment with the aqueous formaldehyde solution is maintained for about from 5 to 55 seconds.

5. The method recited in claim 3, in which the initial treatment with alcohol is maintained for about two minutes.

6. The method recited in claim 3, in which the treatment with formaldehyde-alcohol solution is maintained for from 30 to 60 seconds.

7. The method recited in claim 3, in which the final treatment with absolute alcohol is maintained for from about 2 to 5 minutes.

8. The method of making acid resistant capsule components of self-sustaining substantially pure gelatin which comprises, treating its surfaces in successive steps with an aqueous solution containing from about 0.5% to 0.95% formaldehyde for about 5 to 55 seconds, absolute alcohol for about 2 minutes, a 10% to 20% formaldehyde-alcohol solution in which the alcohol constitutes from 70% to 90% by volume, for about 30 to 60 seconds, and an absolute alcohol for from about 2 to 5 minutes.

9. The method of making acid resistant substantially pure gelatin sheets which comprises, treating its surfaces in successive steps with an aqueous solution containing from about 0.5% to 0.95% formaldehyde for about 5 to 55 seconds, absolute alcohol for about 2 minutes, a 10% to 20% formaldehyde-alcohol solution in which the alcohol constitutes from 70% to 90% by volume for about 30 to 60 seconds, and an absolute alcohol for from about 2 to 5 minutes.

10. The method of making acid resistant capsule components of a self-sustaining film of pure gelatin which comprises initially treating the surfaces of the capsule component with a 0.5% formaldehyde solution so as to rapidly catalyze the chemical penetration of the formaldehyde, immersing the capsule in alcohol to stop such chemical interaction between the formaldehyde and gelatin, immersing the capsule in a solution comprised of about 10% formaldehyde and 85% alcohol to slowly further catalyze the gelatin, immersing the capsule in alcohol to extract all remaining free water and formaldehyde from the gelatin, and then drying the gelatin capsule with forced warm air to stop all interaction between the formaldehyde and the gelatin.

11. The method of treating pure gelatin capsule components which comprises arranging said capsule components in a holder in an individually spaced apart relation, immersing said capsule components in an aqueous solution containing about 0.5% to 0.95% formaldehyde for a period of from about 5 to 55 seconds, withdrawing said capsule components and draining off all free solution therefrom, immersing the capsule components immediately in absolute alcohol for a period of about 2 minutes, withdrawing said capsule components from the alcohol and draining off all free alcohol therefrom, immersing the capsule components in a 10% to 20% formaldehyde-alcohol solution in which the alcohol content ranges from 70% to 90% by volume for from about 30 to 60 seconds, withdrawing the capsule components from said formaldehyde-alcohol solution and draining off free solution therefrom, immersing the capsule components in absolute alcohol for from about 2 to 5 minutes, withdrawing the capsule components from said last named alcohol and draining off the free alcohol therefrom, and then drying the capsule components with warm air while they are still contained in the holder.

12. The method recited in claim 11 in which a quantity of cupric sulphate is added to the absolute alcohol.

References Cited by the Examiner

UNITED STATES PATENTS

| | | | |
|---|---|---|---|
| 276,385 | 4/1883 | Franciscus | 118—31 |
| 2,702,923 | 1/1955 | Plourde | 18—48 |
| 2,702,924 | 3/1955 | Plourde | 18—48 |
| 2,727,833 | 12/1955 | Yen et al. | 117—141 XR |
| 2,975,752 | 3/1961 | Vaughan | 118—13 |

WILLIAM D. MARTIN, *Primary Examiner.*

FRANK CACCIAPAGLIO, Jr., *Examiner.*